United States Patent
Bowers et al.

(10) Patent No.: US 7,185,233 B2
(45) Date of Patent: Feb. 27, 2007

(54) METHOD AND APPARATUS FOR INSERTING SYNCHRONIZED ERRORS

(75) Inventors: Wayne J. Bowers, Fremont, CA (US);
Andrew A. Rutz, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 726 days.

(21) Appl. No.: 10/365,685

(22) Filed: Feb. 12, 2003
(Under 37 CFR 1.47)

(65) Prior Publication Data
US 2004/0078696 A1    Apr. 22, 2004

Related U.S. Application Data

(60) Provisional application No. 60/380,449, filed on May 14, 2002.

(51) Int. Cl.
*G06F 11/00*    (2006.01)
(52) U.S. Cl. .......................................... 714/41; 717/124
(58) Field of Classification Search .................. 714/41, 714/38, 39, 46, 37; 717/124, 106
See application file for complete search history.

(56) References Cited

U.S. PATENT DOCUMENTS

| | | | |
|---|---|---|---|
| 5,671,352 A * | 9/1997 | Subrahmaniam et al. | 714/41 |
| 5,742,753 A | 4/1998 | Nordsieck et al. | |
| 6,161,196 A * | 12/2000 | Tsai | 714/10 |
| 6,170,078 B1 * | 1/2001 | Erle et al. | 716/4 |
| 6,477,666 B1 * | 11/2002 | Sanchez et al. | 714/41 |
| 6,484,276 B1 * | 11/2002 | Singh et al. | 714/41 |
| 6,539,503 B1 * | 3/2003 | Walker | 714/703 |
| 6,560,720 B1 * | 5/2003 | Chirashnya et al. | 714/32 |
| 6,631,481 B1 * | 10/2003 | Hoard et al. | 714/41 |
| 6,671,874 B1 * | 12/2003 | Passova | 717/126 |
| 6,728,668 B1 * | 4/2004 | Kitamorn et al. | 703/22 |
| 6,886,116 B1 * | 4/2005 | MacLellan et al. | 714/703 |
| 2003/0208351 A1 * | 11/2003 | Hartman et al. | 703/22 |

* cited by examiner

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

The present invention provides a method and apparatus for synchronizing errors in a processor-based system. The method includes forming a sequence of a plurality of language elements, wherein the language elements are adapted to create errors in a system. The method further includes providing the sequence to the system.

33 Claims, 7 Drawing Sheets

METHOD AND APPARATUS FOR INSERTING SYNCHRONIZED ERRORS

This application claims the benefit of U.S. Provisional Application No. 60/380,449 entitled "Method and Apparatus for Inserting Synchronized Errors", filed May 14, 2002.

BACKGROUND OF THE INVENTION

1. Field of the Invention

This invention relates generally to processor-based systems, and, more particularly, to inserting synchronized errors in processor-based systems.

2. Description of the Related Art

Processor-based systems may be used in a wide variety of settings. For one example, businesses may use processor-based systems to perform a multiplicity of tasks including, but not limited to, developing new software, maintaining databases of information related to operations and management, and hosting a web server that may facilitate communications with customers. Process-based systems may also be used to organize personal schedules, transmit information around the globe, monitor and provide therapies to internal organs, and navigate satellites, to name only a few more possible uses.

Processor-based systems may, however, be prone to errors that may compromise the operation of the system. For example, a software package running on a processor may request access to a memory location that may already have been allocated to another software package. Allowing the first program to access the memory location could corrupt the contents of the memory location and cause the second program to fail, so the system may deny the first program access and return a system error message. The first program may then fail, perhaps disrupting the operation of the processor and/or the network. Similarly, disconnected power cables, pulled connection wires, and malfunctioning hardware may also disrupt operation of the system.

As it may not generally be possible or desirable for a user to intervene to correct the error, many processor-based systems may be designed to recover from errors without external assistance. Such systems, often referred to as fault tolerant systems, may be particularly useful in complex time-sensitive applications such as implantable medical devices, airplane navigation systems, World Wide Web network hubs, and the like. To test the reliability of a fault tolerant system, individual errors may be created and provided to the system, a method generally referred to as fault insertion. For example, one or more components of the fault tolerant system may be deliberately powered down to test the ability of the system to recover from a power failure in the one or more components.

Traditional fault insertion methods may provide single errors to test the system. This approach may not, however, provide an accurate characterization of the system's ability to recover from a plurality of errors that may occur in sequence or substantially simultaneously. For example, a single mid-range server system may be used for developing new software, maintaining databases of information related to operations and management, and hosting a web server. The mid-range server system may thus be subject to complex sequences of errors generated by the plurality of software applications and hardware components in the system. Traditional fault insertion may not be capable of testing the ability of the system to recover from sequences of errors produced by components of the system.

SUMMARY OF THE INVENTION

In one aspect of the instant invention, an apparatus is provided for synchronizing errors in a processor-based system. The apparatus includes a bus. The apparatus further includes a processor coupled to the bus, wherein the processor is adapted to form a sequence of a plurality of language elements adapted to generate a plurality of errors in a system, form a package including the sequence, provide the package to the system, and provide a signal to be used by the system to generate the plurality of errors based upon the package.

In one aspect of the present invention, a method is provided for synchronizing errors in a processor-based system. The method includes forming a sequence of a plurality of language elements, wherein the language elements are adapted to create errors in a system. The method further includes providing the sequence to the system.

BRIEF DESCRIPTION OF THE DRAWINGS

The invention may be understood by reference to the following description taken in conjunction with the accompanying drawings, in which like reference numerals identify like elements, and in which.

Figure 1:
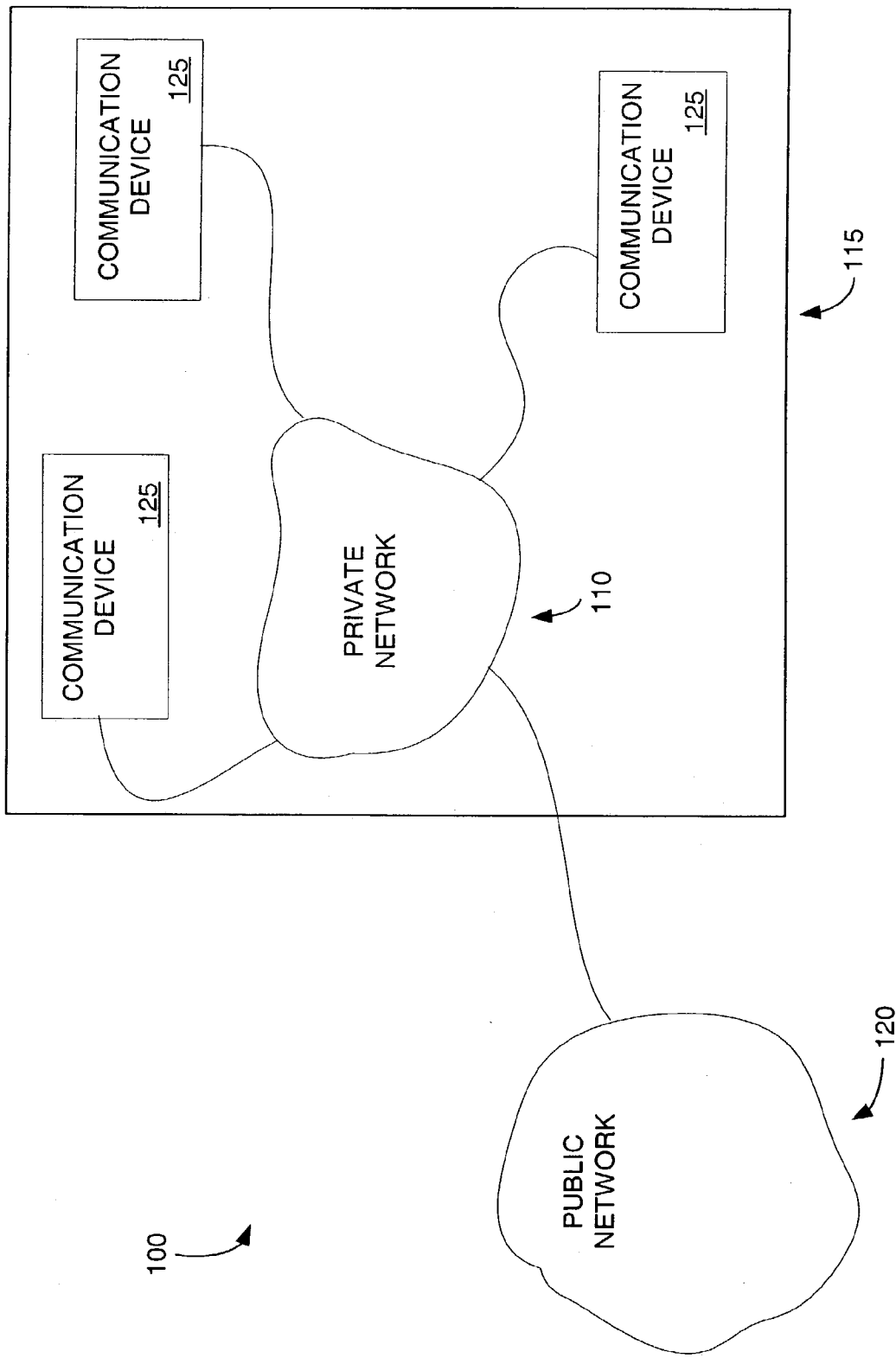
FIG. 1 shows a block diagram of a communications system that includes various nodes or network elements that are capable of communicating with each other, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows a stylized block diagram of an exemplary communication system 100 comprising various nodes or network elements that are capable of communicating with each other. The exemplary network elements and the manner in which they are interconnected are for illustrative purposes only, and are not intended to limit the scope of the invention. A variety of other arrangements and architectures are possible in further embodiments.

The communication system 100 may include a private network 110 that is located in a community 115 coupled to a public network 120 (e.g., the Internet). A "private network" refers to a network that is protected against unauthorized general public access. A "network" may refer to one or more communications networks, links, channels, or paths, as well as routers or gateways used to pass data between elements through such networks, links, channels, or paths. Although reference is made to "private" and "public" networks in this description, further embodiments may include networks without such designations. For example, a community 115 may refer to nodes or elements coupled through a public network 120 or a combination of private and public networks 110, 120.

The nodes or elements may be coupled by a variety of means. The means, well known to those of ordinary skill in the art, may comprise both physical electronic connections such as wires and/or cables and wireless connections such as radio-frequency waves. Although not so limited, the wireless data and electronic communications link/connection may also comprise one of a variety of links or interfaces, such as a local area network (LAN), an Internet connection, a telephone line connection, a satellite connection, a global positioning system (GPS) connection, a cellular connection, a laser wave generator system, any combination thereof, or equivalent data communications links.

In one embodiment, the communication protocol used in the various networks may be the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998. Packet-based networks such as IP networks may communicate with packets, datagrams, or other units of data that are sent over the networks. Unlike circuit-switched networks, which provide a dedicated end-to-end connection or physical path for the duration of a call session, a packet-based network is one in which the same path may be shared by several network elements.

The system 100 may comprise a plurality of communication devices 125 for communicating with the networks 110, 120. The communications devices 125 may comprise computers, Internet devices, or any other electronic device capable of communicating with the networks. Further examples of electronic devices may comprise telephones, fax machines, televisions, or appliances with network interface units to enable communications over the private network 110 and/or the public network 120.

In the course of normal operations, hardware and software components of the one or more communication devices 125 may operate in an incorrect or undesirable fashion and produce one or more errors. As utilized hereinafter, the term "error" refers to the incorrect or undesirable behavior of hardware devices or software applications executing in the system. For example, errors may comprise hardware errors such as a malfunctioning communication device 125 or they may comprise software errors such as an invalid request for access to a memory location. An error may cause the software, the hardware, or the system to become substantially unable to continue performing tasks, a condition that will be referred to hereinafter as a "crash." Errors may also comprise "faults," which generally refer to errors caused by a physical sub-system of the system. For example, when referring to errors caused by malfunctions of the memory, central processing unit (CPU), or other hardware, it is customary to refer to "memory faults," "CPU faults," and "hardware faults," respectively. Faults may also be caused by incorrect or undesirable behavior of software applications.

Although errors are generally undesirable, there are circumstances in which it may be desirable to cause errors in one or more communication devices 125, a process hereinafter referred to as "fault insertion." For example, the reliability of the communication device 125 may be tested by creating one or more code fragments that may cause errors in the communication device 125 and providing the code fragments to the communication device 125. Thus, in accordance with one embodiment of the present invention, complex sequences of errors, such as those that may be generated by the plurality of software applications and hardware components in the communication device 125, may be formed using elements of a fault insertion language. The error sequences may be provided to one or more communication devices 125 and then executed on the communication devices 125.

Figure 2:
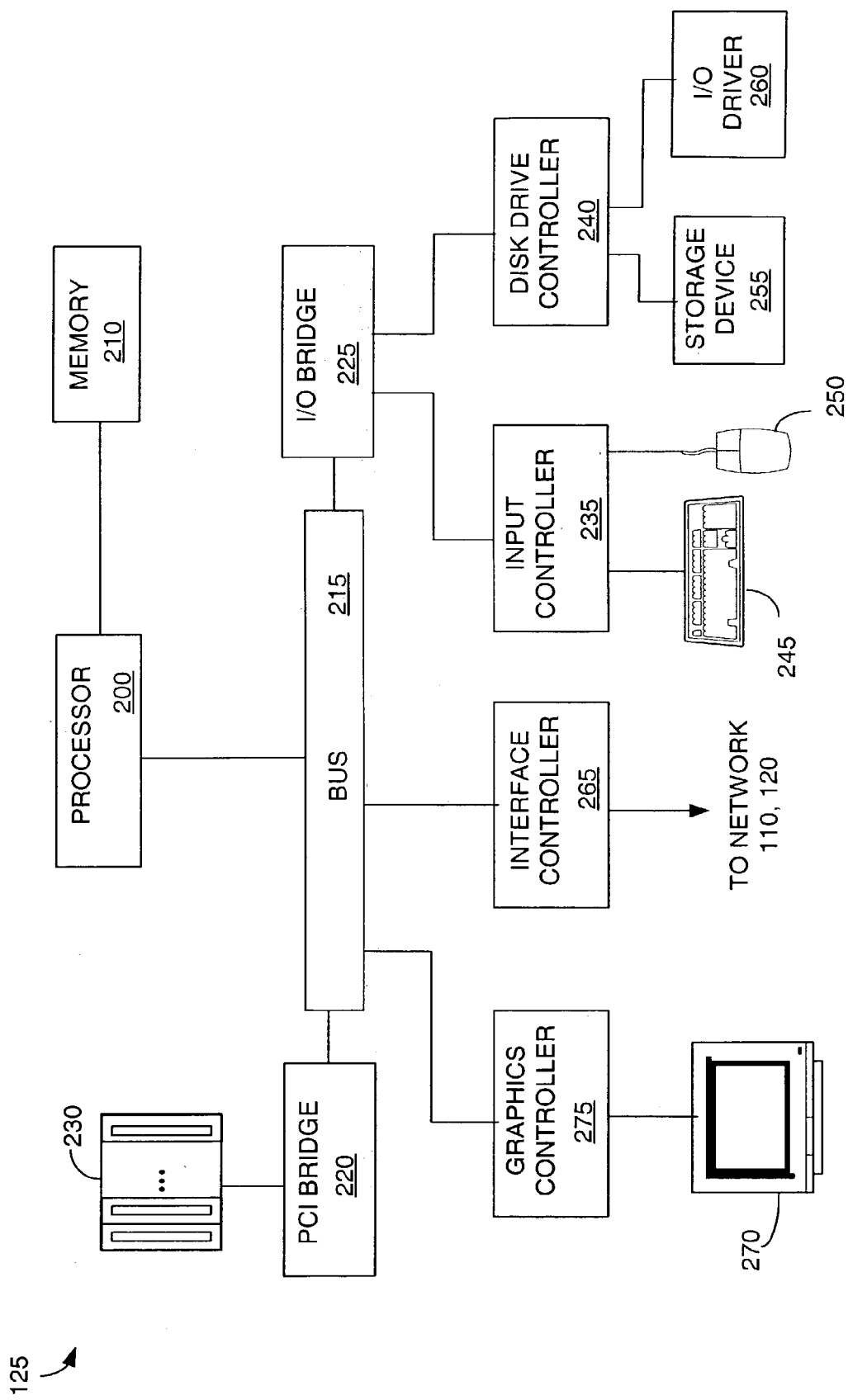
FIG. 2 shows a block diagram of one embodiment of a communication device that may be employed in the communications network shown in FIG. 1.

FIG. 2 shows a block diagram of one embodiment of the communication device 125. For example, the communication device 125 may be a workstation such as the Sun Blade® Workstation. The communication device 125 may comprise at least one processor 200 adapted to perform one or more tasks or to spawn one or more processes. Although not so limited, in one embodiment, the processor 200 may be a 500-MHz UltraSPARC-IIe® processor. The processor 200 may be coupled to at least one memory element 210 adapted to store information. For example, the memory element 210 may comprise 2-gigabytes of error-correcting synchronous dynamic random access memory (SDRAM) coupled to the processor via one or more unbuffered SDRAM dual in-line memory module (DIMM) error-correcting slots (not shown).

In one embodiment, the memory element 210 may be adapted to store a variety of different forms of information including, but not limited to, one or more of a variety of software programs, data produced by the software and hardware, and data provided by the private and public networks 110, 120. Although not so limited, the one or more software programs stored in the memory element 210 may include software applications (e.g. database programs, word processors, and the like) and at least a portion of an operating system (e.g. the Solaris® operating system). The source code for the software programs stored in the memory element 210 may, in one embodiment, comprise one or more instructions that may be used by the processor 200 to perform various tasks or spawn various processes.

The processor 200 may be coupled to a bus 215 that may transmit and receive signals between the processor 200 and any of a variety of devices that may also be coupled to the bus 215. For example, in one embodiment, the bus 215 may be a 32-bit-wide, 33-MHz peripheral component interconnect (PCI) bus. A variety of devices may be coupled to the bus 215 via one or more bridges, which may include a PCI bridge 220 and an I/O bridge 225. It should, however, be appreciated that, in alternative embodiments, the number and/or type of bridges may change without departing from the scope of the present invention. In one embodiment, the PCI bridge 220 may be coupled to one or more PCI slots 230 that may be adapted to receive one or more PCI cards, such as Ethernet cards, token ring cards, video and audio input/output devices, SCSI adapters, and the like.

The I/O bridge 225 may, in one embodiment, be coupled to one or more controllers, such as an input controller 235 and a disk drive controller 240. The input controller 235 may control the operation of such devices as a keyboard 245, a mouse 250, and the like. The disk drive controller 240 may similarly control the operation of a storage device 255 and an I/O driver 260 such as a tape drive, a diskette, a compact disk drive, and the like. It should, however, be appreciated that, in alternative embodiments, the number and/or type of controllers that may be coupled to the I/O bridge 225 may change without departing from the scope of the present invention. For example, the I/O bridge 225 may also be coupled to audio devices, diskette drives, digital video disk drives, parallel ports, serial ports, a smart card, and the like.

An interface controller 265 may be coupled to the bus 215. In one embodiment, the interface controller 265 may be adapted to receive and/or transmit packets, datagrams, or other units of data over the private or public networks 110, 120, in accordance with network communication protocols such as the Internet Protocol (IP), other versions of IP like IPv6, or other packet-based standards as described above. Although not so limited, in alternative embodiments, the interface controller 265 may also be coupled to one or more IEEE 1394 buses, FireWire® ports, universal serial bus ports, programmable read-only-memory ports, and/or 10/100Base-T Ethernet ports.

One or more output devices such as a monitor 270 may be coupled to the bus 215 via a graphics controller 275. The monitor 270 may be used to display information provided by the processor 200. For example, the monitor 270 may display documents, 2-D images, or 3-D renderings.

For clarity and ease of illustration, only selected functional blocks of the communication device 125 are illustrated in FIG. 2, although those skilled in the art will appreciate that the communication device 125 may comprise additional or fewer functional blocks. Additionally, it should be appreciated that FIG. 2 illustrates one possible configuration of the communication device 125 and that other configurations comprising different interconnections may also be possible without deviating from the scope of the present invention. For example, in an alternative embodiment, the communication device 125 may include additional or fewer bridges 220, 225. As an additional example, in an alternative embodiment, the interface controller 265 may be coupled to the processor 200 directly. Similarly, other configurations may be possible.

Figure 3:
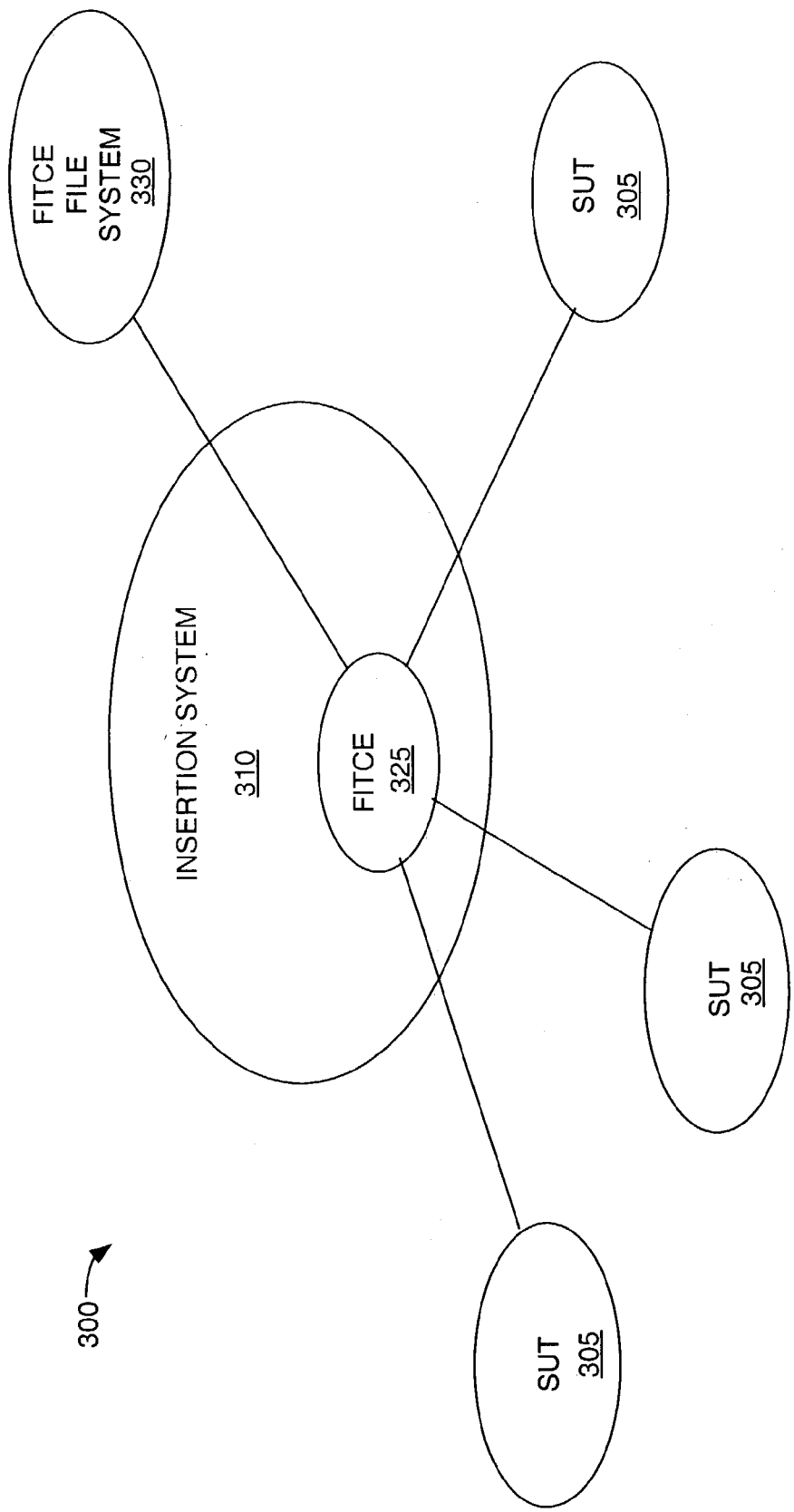
FIG. 3 shows a block diagram of an exemplary fault insertion system that may be used to insert errors into one or more systems under test, such as the communication device shown in FIG. 2, in accordance with one embodiment of the present invention.

Referring now to FIG. 3, a block diagram of an exemplary fault insertion system 300 is shown. The fault insertion system 300 may, in one embodiment, comprise one or more systems under test (SUTs) 305 and at least one insertion system 310. The systems 305, 310 may be formed of one or more communications devices 125, which may be coupled by a network 110, 120. The systems 305, 310 and the manner in which they are interconnected in FIG. 3A are for illustrative purposes only, and thus the systems 305, 310 may, in alternative embodiments, be interconnected in any other desirable manner. For example, the insertion system 310 may be coupled to the one or more SUTs 305 by a private or public network 110, 120, as described above. However, it should also be appreciated that the SUTs 305 and the insertion system 310 may, in alternative embodiments, be implemented in a single communication device 125.

Figure 4A:
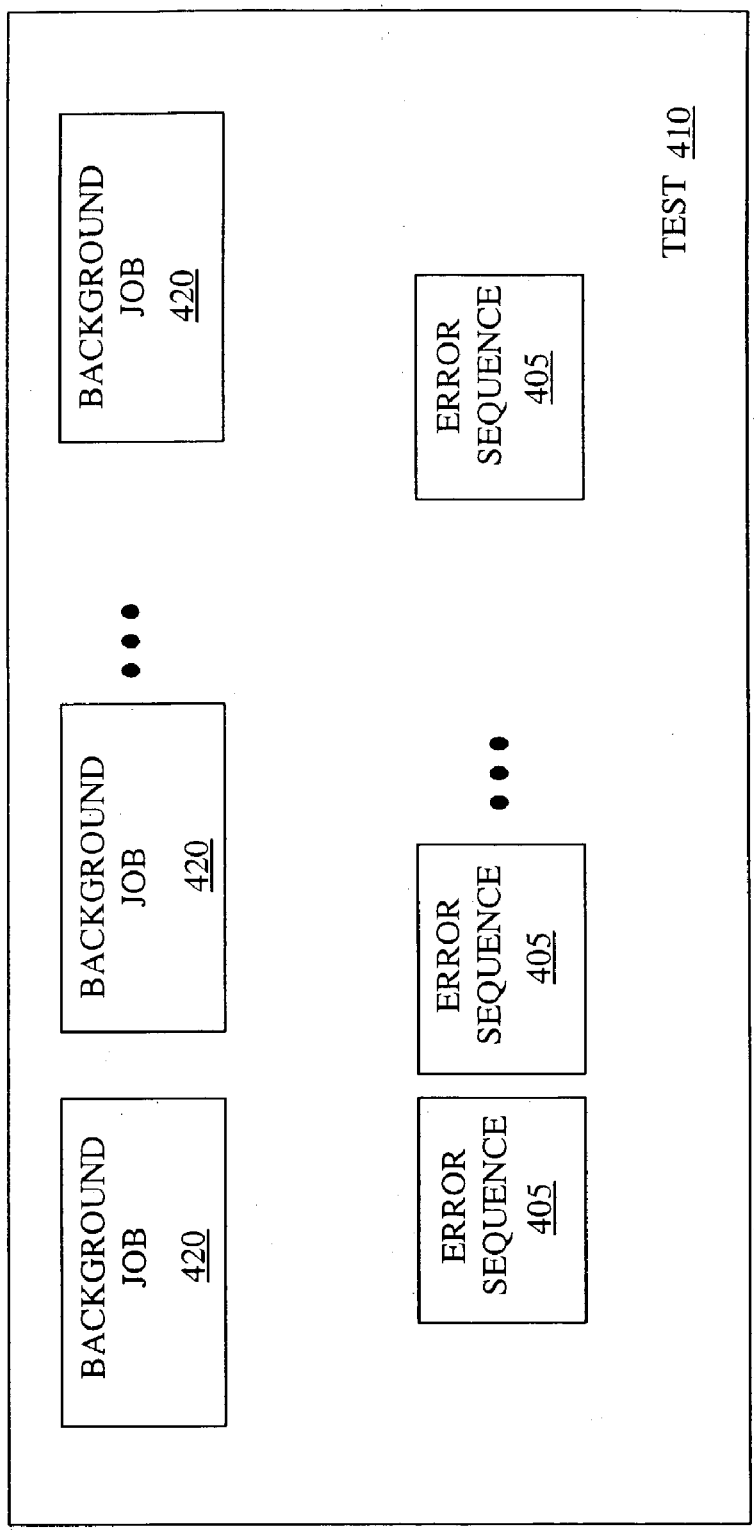
FIGS. 4A–B show block diagrams of a suite that may be created by the fault insertion system shown in FIG. 3, in accordance with one embodiment of the present invention.

The insertion system 310 may include a fault insertion test creation environment (FITCE) 325, in accordance with one embodiment of the present invention. Although not so limited, the FITCE 325 may be a visual programming environment that may assist a user to create one or more error sequences 405, as shown in FIG. 4A. In one embodiment, the visual programming environment provided by the FITCE 325 may provide a graphical user interface (GUI), such as a FITCE GUI 500 main window shown in FIG. 5, which may enable the user to create the error sequences 405. In alternative embodiments, the user may create the error sequences 405 using any of a variety of editing, programming, or other applications well known to those of ordinary skill in the art.

Figure 5:
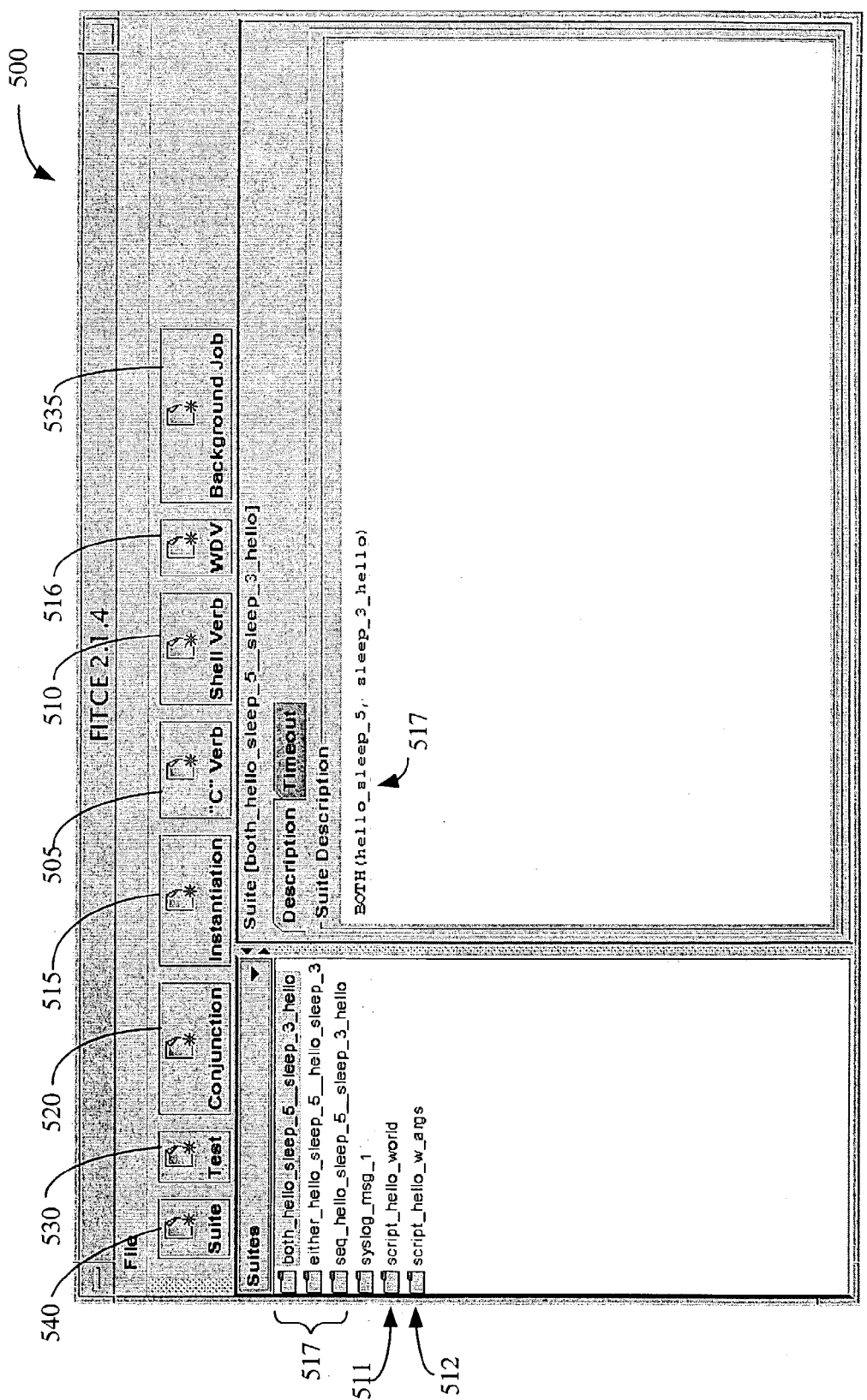
FIG. 5 shows an illustration of a graphical user interface (GUI) that may be used by the insertion system shown in FIG. 3, in accordance with one embodiment of the present invention.

The error sequences 405 may be formed from one or more templates (not shown) of a FITCE language. In one embodiment, the templates may be one or more code fragments in the C programming language or shell scripts. However, it will be appreciated that, in alternative embodiments, the elements may be formed in any of a variety of programming languages (e.g. C++, Visual Basic, and Java) or scripts (e.g. Perl, JavaScript, or AppleScript). The FITCE language elements may include "verbs" and "adverbs". In one embodiment, verbs may be code fragments that implement an action. For example, the verb may be a code fragment written in the C programming language that includes instructions that when executed enable the SUT 305 to write "Hello, world!" to the monitor 270 shown in FIG. 2. In one embodiment, adverbs may be code fragments that modify the sequence of actions implemented by the verbs. For example, the adverb may instruct the SUT 305 to write "Hello, world!" substantially after the SUT 305 completes initialization. Although not so limited, in one embodiment, the templates may be created using the FITCE GUI 500 by clicking on a GUI button, such as a "C" Verb button 505 or a Shell Verb button 510, as shown in FIG. 5.

Referring back to FIG. 3, the FITCE language elements may be stored in a FITCE file system 330. In one embodiment, the FITCE file system 330 may be integrated in the systems 305, 310, although for the sake of clarity the FITCE file system 330 is depicted as a stand-alone entity in FIG. 3. In alternative embodiments, portions of the FITCE file system 330 may be distributed among the one or more SUTs 305, the insertion system 310, and/or other systems (not shown). Templates may be named and stored in the FITCE file system 330. For example, the error sequence 405 that includes instructions that when executed enable the SUT 305 to write "Hello, world!" may be named script_hello_world 511 and stored in the FITCE file system 330. Templates may also be provided by other users or with the shipped product.

Templates may, in one embodiment, accept one or more variables and/or arguments. The variables and/or arguments may, in one embodiment, be provided to the template by the user, a process that will be referred to hereinafter as "instantiating" the template. For example, the user may instantiate a print template by providing the string "Hello, world!" to the print template, which may enable the SUT 305 to write "Hello, world!" to the monitor 270 shown in FIG. 2. The template may be named and stored for re-use. For example, the print template that may accept a variable such as the string "Hello, world!" may be named script_hello_w_args 512 (see FIG. 5) and stored in the FITCE file system 330. Although not so limited, in one embodiment, the variables in the templates may be instantiated using the FITCE GUI 500 by clicking on a GUI button, such as an Instantiation button 515 or a WDV button 516, as shown in FIG. 5.

A plurality of templates may be conjoined to form a complex template 517. Although not so limited, in one embodiment, the plurality of templates may be conjoined using at least one of an SEQ, a BOTH, and an EITHER conjunction. The SEQ conjunction may enable the SUT 305 to execute the plurality of templates in the complex template 517 sequentially. The BOTH conjunction may enable the SUT 305 to execute the plurality of templates in the complex template 517 at substantially the same time. The EITHER conjunction may enable the SUT 305 to execute any one of the plurality of templates in the complex template 517. In one embodiment, the plurality of templates may be conjoined using the FITCE GUI 500 by clicking on a GUI button, such as a Conjunction button 520, as shown in FIG. 5. The complex template 517 may also be named and stored in the FITCE file system 330.

FIG. 4A shows a block diagram of a test 410 that may be created by the fault insertion system 300. One or more error sequences 405, such as script_hello_world 511 and the instantiated complex templates 517, may be used to create the test 410. In one embodiment, the test 410 may be able to execute on the SUT 305 and insert the error sequences 405 into the SUT 305. Although not so limited, in one embodiment, the test 410 may be formed using the FITCE GUI 500 by clicking on a GUI button, such as a Test button 530, as shown in FIG. 5. The test 410 may also include one or more background jobs 420. For example, the one or more background jobs 420 may include benchmarks such as the SpecWeb99 benchmark for web server, the SpecJVM98 benchmark for Java Virtual Machines, online transaction processing benchmarks provided by the Transaction Processing Performance Council, and the like. Although not so limited, in one embodiment, the background jobs 420 may be formed using the FITCE GUI 500 by clicking on a GUI button, such as a Background Job button 535, as shown in FIG. 5.

Figure 4B:
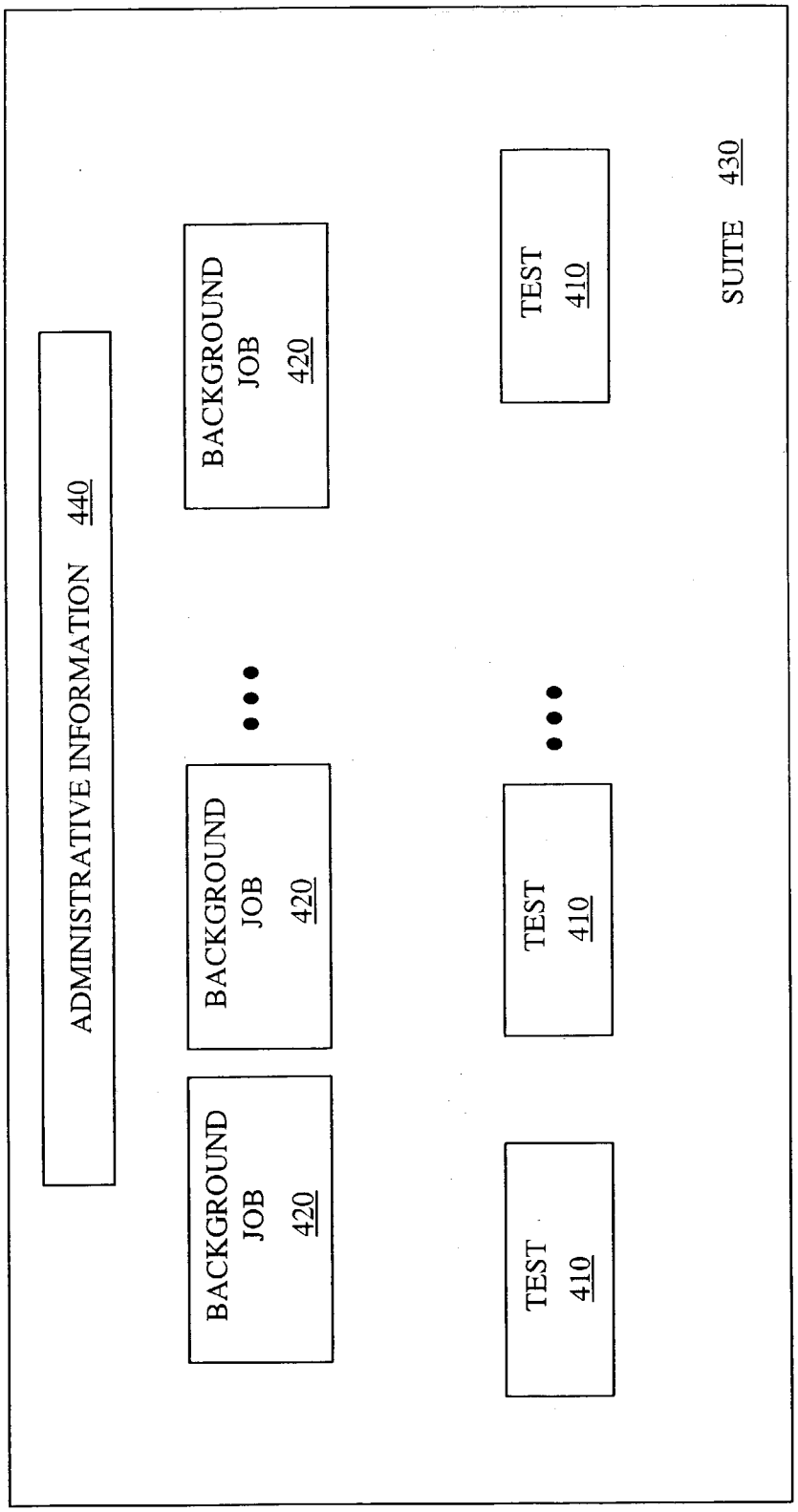

FIG. 4B shows a block diagram of a suite 430 that may be created by the fault insertion system 300. To insert the error sequences 405 into the SUT 305, the test 410 may be included in the suite 430. In one embodiment, the suite 430 may be a self-contained fault insertion program that may be converted to an executable package that may be run by, for example, the SUT 305 that may be using a Solaris® operating system. The suite 430 may include one or more tests 410, as well as any desirable background jobs 420 and any other desirable administrative information 440 that may be used in any desirable manner before, during, or after the tests 410. For example, the suite 430 may include a description of the function of the suite. For another example, the suite 430 may include a timeout value that may determine how long the suite 430 may run. Although not so limited, in one embodiment, the suite 430 may be formed using the FITCE GUI 500 by clicking on a GUI button, such as a Suite button 540, as shown in FIG. 5.

Figure 6:
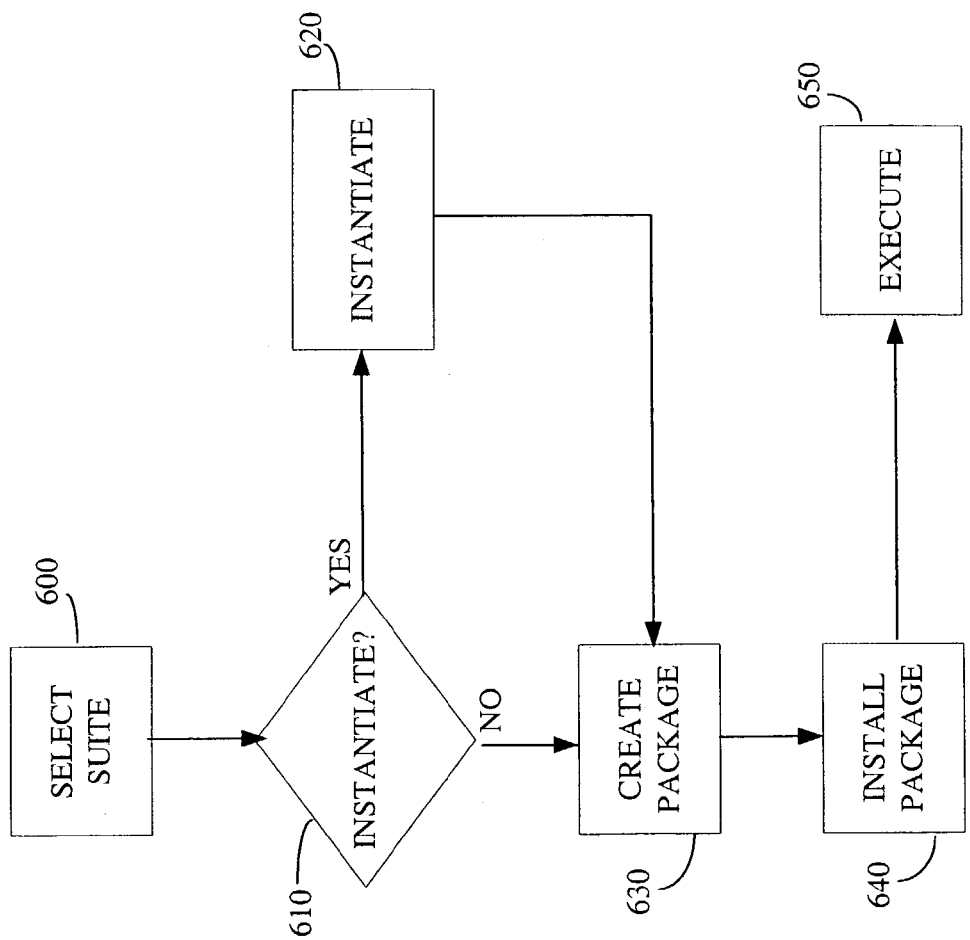
FIG. 6 shows a flow diagram illustrating an exemplary method of inserting errors into a system under test, in accordance with one embodiment of the present invention.

FIG. 6 shows a flow diagram illustrating an exemplary method of inserting a suite 430 in the SUT 305, in accordance with one embodiment of the present invention. The user may select (at 600) the suite 430. In one embodiment, the suite 430 may be selected (at 600) using the FITCE GUI 500 by clicking on the name of the suite 430, such as both_hello_sleep_5_sleep_3_hello 517. The user or the FITCE 325 may then determine (at 610) that it may be desirable to instantiate (at 620) the selected suite 430. For example, the user or the FITCE 325 may determine (at 610) that it may be desirable to provide (at 620) the string "Hello, world!" to the script hello_w_args 512. Once the suite 430 has been substantially instantiated (at 620), or if the user or the FITCE 325 determines (at 610) that it may not be desirable to instantiate (at 620) the selected suite 430, the FITCE 325 may create (at 630) a package. Although not so limited, in one embodiment, creating (at 630) the package may include such actions as compressing the suite 430, archiving the suite 430, and the like.

The package may then be installed (at 640) on one or more SUTs 305. Although not so limited, in one embodiment, installing (at 640) the package may include such actions as transmitting the package to the one or more SUTs 305 via the networks 110, 120, providing the package to an appropriate location in the SUT 305, uncompressing the package, compiling any desirable code fragments, and the like. The installed package may then be executed (at 650) on the SUT 305. Although not so limited, in one embodiment, executing (at 650) the package may include such actions as running the compiled code fragments, executing shell scripts, and the like. In one embodiment, installing (at 640) and/or executing (at 650) the package may occur in response to a signal from the user, which may be generated using the FITCE GUI 500. In alternative embodiments, installing (at 640) and/or executing (at 650) the package may occur in response to a signal provided by the insertion system 310, one or more of the SUTs 305, or any combination thereof.

By creating and inserting errors into the SUT 305, the present invention may help users to test the reliability of the SUT 305, or software and hardware components thereof, when subjected to complex error sequences. For example, an engineering team may, using one or more embodiments of the present invention, test an upgrade of an operating system before shipping the operating system. That is, the engineering team may first install the operating system on one or more communication devices 125, which may then be continuously operated with a variety of applications operating therein. A test suite of errors may be created by the engineering team and inserted into the communication devices 125, potentially revealing one or more shortcomings in the operating system under test. For example, a sequence of errors may cause the operating system to repeatedly crash when a particular software application performs a specific task on a certain vendor's personal computer. The engineering team may use this information to provide a method to recover from the sequence of errors before shipping the upgraded version of the operating system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   forming a sequence of a plurality of language elements, wherein the language elements are adapted to create errors in a system;

forming a test, wherein the test includes at least the sequence and a first selected number of background jobs;

forming a suite, wherein the suite includes at least one test and a second selected number of background jobs; and forming a package using the suite, wherein forming the package comprises compressing the suite;

providing the test including the sequence to the system.

2. The method of claim 1, wherein forming the sequence comprises determining an order for the plurality of language elements.

3. The method of claim 2, wherein providing the sequence comprises providing the plurality of language elements in the determined order.

4. The method of claim 3, wherein providing the plurality of language elements in the determined order comprises providing a first portion of the language elements and a second portion of the language elements at substantially the same time.

5. The method of claim 3, wherein providing the plurality of language elements in the determined order comprises providing a second portion of the language elements a predetermined time after providing a first portion of the language elements.

6. The method of claim 1, wherein forming the sequence comprises forming the sequence using at least one template.

7. The method of claim 6, wherein forming the sequence comprises providing at least one variable to the template.

8. The method of claim 1, wherein forming the package comprises archiving the suite.

9. The method of claim 1, wherein providing the sequence to the system comprises providing the package to the system.

10. The method of claim 9, further comprising executing the package on the system.

11. The method of claim 1, wherein providing the sequence comprises providing the sequence in response to a signal from the user.

12. The method of claim 1, further comprising providing an interface to a user, wherein the interface is adapted to enable the user to form the sequence and provide the sequence to the system.

13. The method of claim 12, wherein providing the interface comprises providing a graphical user interface (GUI).

14. A method, comprising:

forming a sequence of a plurality of language elements, wherein the language elements are adapted to generate a plurality of errors in a system;

providing an interface to a user, wherein the interface is adapted to enable the user to form the sequence and provide the sequence to the system, wherein providing the interface comprises providing a graphical user interface (GUI);

forming a package including the sequence;

providing the package to the system;

generating the plurality of errors in the system using the package;

wherein forming the package comprises forming the package using a suite that includes the sequence and a predetermined number of background jobs.

15. The method of claim 14, wherein forming the package comprises providing at least one variable to the sequence.

16. The method of claim 14, wherein generating the plurality of errors comprises generating a first portion of the errors and a second portion of the errors at substantially the same time.

17. The method of claim 14, wherein generating the plurality of errors comprises generating a second portion of the errors a predetermined time after generating a first portion of the errors.

18. The method of claim 14, wherein generating the plurality of errors comprises generating at least one of a first portion of the errors and a second portion of the errors.

19. The method of claim 14, wherein providing the package comprises providing the package via a network.

20. An article comprising one or more machine-readable storage media containing instructions that when executed enable a processor to:

determine a sequence of a plurality of language elements, wherein the language elements are adapted to generate a plurality of errors in a system;

form a test, wherein the test includes at least the sequence and a first selected number of background jobs;

form a suite, wherein the suite includes at least one test and a second selected number of background jobs;

form a package including the sequence and the suite, wherein forming the package comprises compressing the suite;

provide the package to the system; and provide a signal to be used by the system to generate the plurality of errors based upon the package.

21. The article of claim 20, wherein the instructions when executed enable the processor to determine the sequence of language elements such that a first portion of the errors and a second portion of the errors will be generated at substantially the same time.

22. The article of claim 20, wherein the instructions when executed enable the processor to determine the sequence of the language elements such that a second portion of the errors will be generated a predetermined time after a first portion of the errors are generated.

23. The article of claim 20, wherein the instructions when executed enable the processor to determine the sequence of the language elements such that at least one of a first portion of the errors and a second portion of the errors will be generated.

24. The article of claim 20, wherein the instructions when executed enable the processor to provide a graphical user interface (GUI).

25. The article of claim 20, wherein the instructions when executed enable the processor to provide the package via a network.

26. The article of claim 20, wherein the instructions when executed enable the processor to provide the signal via a network.

27. An apparatus, comprising:

a bus;

a processor coupled to the bus, wherein the processor is adapted to form a sequence of a plurality of language elements adapted to generate a plurality of errors in a system, form a package including the sequence, provide the package to the system, and provide a signal to be used by the system to generate the plurality of errors based upon the package; and a user interface, wherein the user interface is adapted to enable the user to form the sequence and provide the sequence to the system, wherein providing the interface comprises providing a graphical user interface (GUI);

wherein the processor is further adapted to form the package using a suite that includes the sequence and a predetermined number of background jobs.

28. The apparatus of claim 27, wherein the processor is further adapted to form the package such that a first portion of the errors and a second portion of the errors are generated at substantially the same time.

29. The apparatus of claim 27, wherein the processor is further adapted to form the package such that a second portion of the errors is generated a predetermined time after a first portion of the errors is generated.

30. The apparatus of claim 27, wherein the processor is further adapted to form the package such that at least one of a first portion of the errors and a second portion of the errors is generated.

31. The apparatus of claim 27, wherein the processor is further adapted to provide the package via a network.

32. An apparatus, comprising:
   means for forming a sequence of a plurality of language elements, wherein the language elements are adapted to create errors in a system;
   forming a test, wherein the test includes at least the sequence and a first selected number of background jobs;
   forming a suite, wherein the suite includes at least one test and a second selected number of background jobs; and
   forming a package using the suite, wherein forming the package comprises compressing the suite;
   means for providing the test including the sequence to the system.

33. The method of claim 3, wherein providing the plurality of language elements in the determined order comprises providing at least one of a first portion of the language elements and a second portion of the language elements.

* * * * *